(12) United States Patent
Lin

(10) Patent No.: US 12,135,889 B2
(45) Date of Patent: Nov. 5, 2024

(54) CONTROL METHOD OF FLASH MEMORY CONTROLLER AND ASSOCIATED FLASH MEMORY CONTROLLER AND STORAGE DEVICE

(71) Applicant: Silicon Motion, Inc., Hsinchu County (TW)

(72) Inventor: Ching-Hui Lin, Hsinchu County (TW)

(73) Assignee: Silicon Motion, Inc., Hsinchu County (TW)

(*) Notice: Subject to any disclaimer, the term of this patent is extended or adjusted under 35 U.S.C. 154(b) by 0 days.

(21) Appl. No.: 18/215,185

(22) Filed: Jun. 28, 2023

(65) Prior Publication Data

US 2023/0342055 A1 Oct. 26, 2023

Related U.S. Application Data

(63) Continuation of application No. 17/671,603, filed on Feb. 15, 2022, now Pat. No. 11,733,895.

(60) Provisional application No. 63/168,267, filed on Mar. 31, 2021.

(51) Int. Cl.
G06F 12/00 (2006.01)
G06F 3/06 (2006.01)

(52) U.S. Cl.
CPC ............ G06F 3/064 (2013.01); G06F 3/0604 (2013.01); G06F 3/0631 (2013.01); G06F 3/0656 (2013.01); G06F 3/0679 (2013.01)

(58) Field of Classification Search
CPC ...... G06F 3/064; G06F 3/0604; G06F 3/0631; G06F 3/0605; G06F 3/0679; G06F 12/0238; G06F 12/1009; G06F 2212/7201; G06F 3/0644; G06F 12/0246; G06F 12/0284
See application file for complete search history.

(56) References Cited

U.S. PATENT DOCUMENTS

| 8,180,953 | B2 | 5/2012 | Chu |
| 9,251,087 | B2 | 2/2016 | Nellans |
| 11,733,895 | B2 * | 8/2023 | Lin ........................ G06F 3/0656 711/154 |
| 2011/0302352 | A1 | 12/2011 | Lee |
| 2018/0165022 | A1 | 6/2018 | Tomic |
| 2019/0012260 | A1 | 1/2019 | Kawamura |

(Continued)

FOREIGN PATENT DOCUMENTS

| CN | 101859278 A | 10/2010 |
| CN | 109086219 A | 12/2018 |

(Continued)

OTHER PUBLICATIONS

Lin, the specification, including the claims, and drawings in the U.S. Appl. No. 17/671,602, filed Feb. 15, 2022.

*Primary Examiner* — John A Lane
(74) *Attorney, Agent, or Firm* — Winston Hsu

(57) ABSTRACT

The present invention provides a control method of the flash memory controller. In the control method, after receiving a deallocate command from a host device, the flash memory controller will update a valid page count table, a detailed valid page count table and/or a zone valid page count table according to deallocate command, for the flash memory controller to efficiently and quickly determine if any one of the zones does not have any valid data, so that the flash memory controller can recommend the host device to send a reset command to reset the zone.

9 Claims, 21 Drawing Sheets

(56) References Cited

U.S. PATENT DOCUMENTS

| | | |
|---|---|---|
| 2019/0146925 A1 | 5/2019 | Li |
| 2020/0026436 A1 | 1/2020 | Ou |
| 2020/0081833 A1 | 3/2020 | Lee |
| 2020/0167274 A1 | 5/2020 | Bahirat |
| 2021/0089217 A1 | 3/2021 | Bjørling |
| 2021/0132827 A1 | 5/2021 | Helmick |
| 2021/0141537 A1 | 5/2021 | Ou |
| 2021/0182189 A1 | 6/2021 | Duan |
| 2021/0223962 A1 | 7/2021 | Esaka |
| 2022/0100390 A1 | 3/2022 | Bjorling |
| 2022/0138099 A1 | 5/2022 | Kang |
| 2022/0171532 A1 | 6/2022 | Kang |
| 2022/0414003 A1 | 12/2022 | Duan |
| 2023/0058424 A1 | 2/2023 | Frolikov |

FOREIGN PATENT DOCUMENTS

| | | |
|---|---|---|
| CN | 110908930 A | 3/2020 |
| TW | I344795 | 7/2011 |
| TW | 201411347 A | 3/2014 |
| TW | 201413453 A | 4/2014 |
| TW | 201830253 A | 8/2018 |
| TW | I633428 B | 8/2018 |
| TW | I698749 B | 7/2020 |
| TW | I705353 B | 9/2020 |

\* cited by examiner

| Starting logical address of the zone | Physical block address |
|---|---|
| Z1_LBA_S | PBA3, PBA7, PBA8 |
| Z3_LBA_S | PBA12, PBA99, PBA6 |
| ... | ... |

FIG. 8

| Physical block | Valid page count |
|---|---|
| B1 | |
| B2 | |
| B3 | 128 |
| ⋮ | ⋮ |
| B6 | 60 |
| B7 | 128 |
| B8 | 60 |
| ⋮ | ⋮ |
| B12 | 128 |
| ⋮ | ⋮ |
| B99 | 128 |
| ⋮ | ⋮ |

FIG. 9

| Logical address | Physical block address |
|---|---|
| Z1_LBA_S | PBA3 |
| Z1_LBA_S+y | PBA7 |
| Z1_LBA_S+2*y | PBA8 |
| Z3_LBA_S | PBA12 |
| Z3_LBA_S+y | PBA99 |
| Z3_LBA_S+2*y | PBA8 |
| ... | ... |

1300

| Logical address | Physical block address and physical page address |
|---|---|
| Z1_LBA_S+2*y (Z1_2) | PBA8, P1 |
| Z3_LBA_S+2*y (Z3_2) | PBA8, P61 |
| ... | ... |

| Physical block | Valid page count |
|---|---|
| B1 | |
| B2 | |
| B3 | 128 |
| ⋮ | ⋮ |
| B7 | 128 |
| B8(shared block) | 86 |
| ⋮ | ⋮ |
| B12 | 128 |
| ⋮ | ⋮ |
| B99 | 128 |
| ⋮ | ⋮ |

| Zone number | Starting physical page address | Full | Valid page count |
|---|---|---|---|
| Z1_2 | P1 | Yes | 60 |
| Z3_2 | P61 | No | 26 |
| .... | .... | .... | .... |

FIG. 15

| Zone | Valid page count |
|------|------------------|
| Z1 | 282 → 100 → 0 |
| Z2 | 282 |
| Z3 | 282 → 200 |
| .... | .... |

FIG. 17

| Zone | Deallocate command history | Valid page count |
|---|---|---|
| Z1 | 111111….111111….11111 | 282 |
| Z2 | 111111….111111….11111 | 282 |
| Z3 | 111111….111111….11111 | 282 |
| …. | …. | …. |

| Zone | Deallocate command history | Valid page count |
|---|---|---|
| Z1 | 111111⋯.00000⋯.00000⋯.11111 | 282→100 |
| Z2 | 111111⋯.111111⋯..1111 | 282 |
| Z3 | 111111⋯.111111⋯..1111 | 282 |
| .... | .... | .... |

CONTROL METHOD OF FLASH MEMORY CONTROLLER AND ASSOCIATED FLASH MEMORY CONTROLLER AND STORAGE DEVICE

CROSS REFERENCE TO RELATED APPLICATIONS

This application is a continuation application of U.S. Application Ser. No. 17/671,603, filed on Feb. 15, 2022, which claims the benefit of U.S. Provisional Application No. 63/168,267, filed on Mar. 31, 2021. The contents of these applications are incorporated herein by reference.

BACKGROUND OF THE INVENTION

1. Field of the Invention

The present invention relates to a flash memory, and more particularly, to a flash memory controller and an associated control method.

2. Description of the Prior Art

In the Non-Volatile Memory express (NVMe) specification, a zoned namespace is standardized. However, since the above-mentioned zoned namespace and each zone within it are viewed purely from the perspective of a host device, how to propose an efficient memory management method to correctly and quickly perform appropriate processing for the commands of a host device is an important issue.

SUMMARY OF THE INVENTION

It is therefore an objective of the present invention to provide a flash memory controller capable of efficiently managing a flash memory module according to deallocate commands from the host device, to solve the above-mentioned problems.

According to one embodiment of the present invention, a control method of a flash memory controller is disclosed, wherein the flash memory controller is configured to access a flash memory module, the flash memory module comprises a plurality of blocks, and the control method comprising: receiving a settling command from a host device, wherein the settling command configures at least one portion of the flash memory module as a zoned namespace, wherein the zoned namespace logically comprises a plurality of zones, the host device performs a zone-based data write operation on the zoned namespace, each zone has a same size, logical addresses corresponding to each zone are continuous, and the logical addresses are not overlapping between zones; writing data of a first zone into a plurality of first blocks; establishing a zone-block mapping table, wherein the zone-block mapping table comprises information about the first zone and the corresponding first blocks and a shared block; establishing or updating a valid page count table after the data is written into the plurality of first blocks, wherein the valid page count table records each of the blocks and corresponding valid page count; receiving at least one deallocate command from the host device, wherein each deallocate command comprises a logical address range that is to be deallocated; updating the valid page count table according to the deallocate command to generate an updated valid page count table; determining if the valid page counts of all of the first blocks corresponding to the first zone become zero according to the updated valid page count table; if the valid page counts of all of the first blocks corresponding to the first zone become zero, monitoring the shared block to determine if the first zone does not have any valid data within the shared block; and if it is determined that the first zone does not have any valid data within the shared block, recommending the host device to send a reset command, wherein the reset command is used to reset the first zone.

According to one embodiment of the present invention, a flash memory controller is disclosed, wherein the flash memory controller is configured to access a flash memory module, the flash memory module comprises a plurality of blocks, and the flash memory controller comprises a read only memory configured to store a code, a microprocessor configured to execute the code for controlling access of the flash memory module; and a buffer memory. The microprocessor is configured to perform the steps of: receiving a settling command from a host device, wherein the settling command configures at least one portion of the flash memory module as a zoned namespace, wherein the zoned namespace logically comprises a plurality of zones, the host device performs a zone-based data write operation on the zoned namespace, each zone has a same size, logical addresses corresponding to each zone are continuous, and the logical addresses are not overlapping between zones; writing data of a first zone into a plurality of first blocks; establishing a zone-block mapping table, wherein the zone-block mapping table comprises information about the first zone and the corresponding first blocks and a shared block; establishing or updating a valid page count table after the data is written into the plurality of first blocks, wherein the valid page count table records each of the blocks and corresponding valid page count; receiving at least one deallocate command from the host device, wherein each deallocate command comprises a logical address range that is to be deallocated; updating the valid page count table according to the deallocate command to generate an updated valid page count table; determining if the valid page counts of all of the first blocks corresponding to the first zone become zero according to the updated valid page count table; if the valid page counts of all of the first blocks corresponding to the first zone become zero, monitoring the shared block to determine if the first zone does not have any valid data within the shared block; and if it is determined that the first zone does not have any valid data within the shared block, recommending the host device to send a reset command, wherein the reset command is used to reset the first zone.

According to one embodiment of the present invention, a storage device comprising a flash memory module and a flash memory controller is disclosed. The flash memory module comprises a plurality of blocks. The flash memory controller is configured to access the flash memory module. The flash memory controller is configured to perform the steps of: receiving a settling command from a host device, wherein the settling command configures at least one portion of the flash memory module as a zoned namespace, wherein the zoned namespace logically comprises a plurality of zones, the host device performs a zone-based data write operation on the zoned namespace, each zone has a same size, logical addresses corresponding to each zone are continuous, and the logical addresses are not overlapping between zones; writing data of a first zone into a plurality of first blocks; establishing a zone-block mapping table, wherein the zone-block mapping table comprises information about the first zone and the corresponding first blocks and a shared block; establishing or updating a valid page count table after the data is written into the plurality of first blocks, wherein the valid page count table records each of the blocks and corresponding valid page count; receiving at least one deallocate command from the host device, wherein each deallocate command comprises a logical address range that is to be deallocated; updating the valid page count table according to the deallocate command to generate an updated valid page count table; determining if the valid page counts of all of the first blocks corresponding to the first zone become zero according to the updated valid page count table; if the valid page counts of all of the first blocks corresponding to the first zone become zero, monitoring the shared block to determine if the first zone does not have any valid data within the shared block; and if it is determined that the first zone does not have any valid data within the shared block, recommending the host device to send a reset command, wherein the reset command is used to reset the first zone.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8 is a diagram illustrating an L2P mapping table according to an embodiment of the present invention.

FIG. 9 shows a valid page count table according to one embodiment of the present invention.

FIG. 13 is a diagram illustrating the L2P mapping table and a shared block table according to an embodiment of the present invention.

FIG. 15 shows a detailed valid page count table according to one embodiment of the present invention.

FIG. 17 is a diagram illustrating a zone valid page count table according to one embodiment of the present invention.

FIG. 19 is a diagram illustrating a zone valid page mapping table according to one embodiment of the present invention.

FIG. 20 is a diagram illustrating updating the zone valid page mapping table according to one embodiment of the present invention.

DETAILED DESCRIPTION

Figure 1:
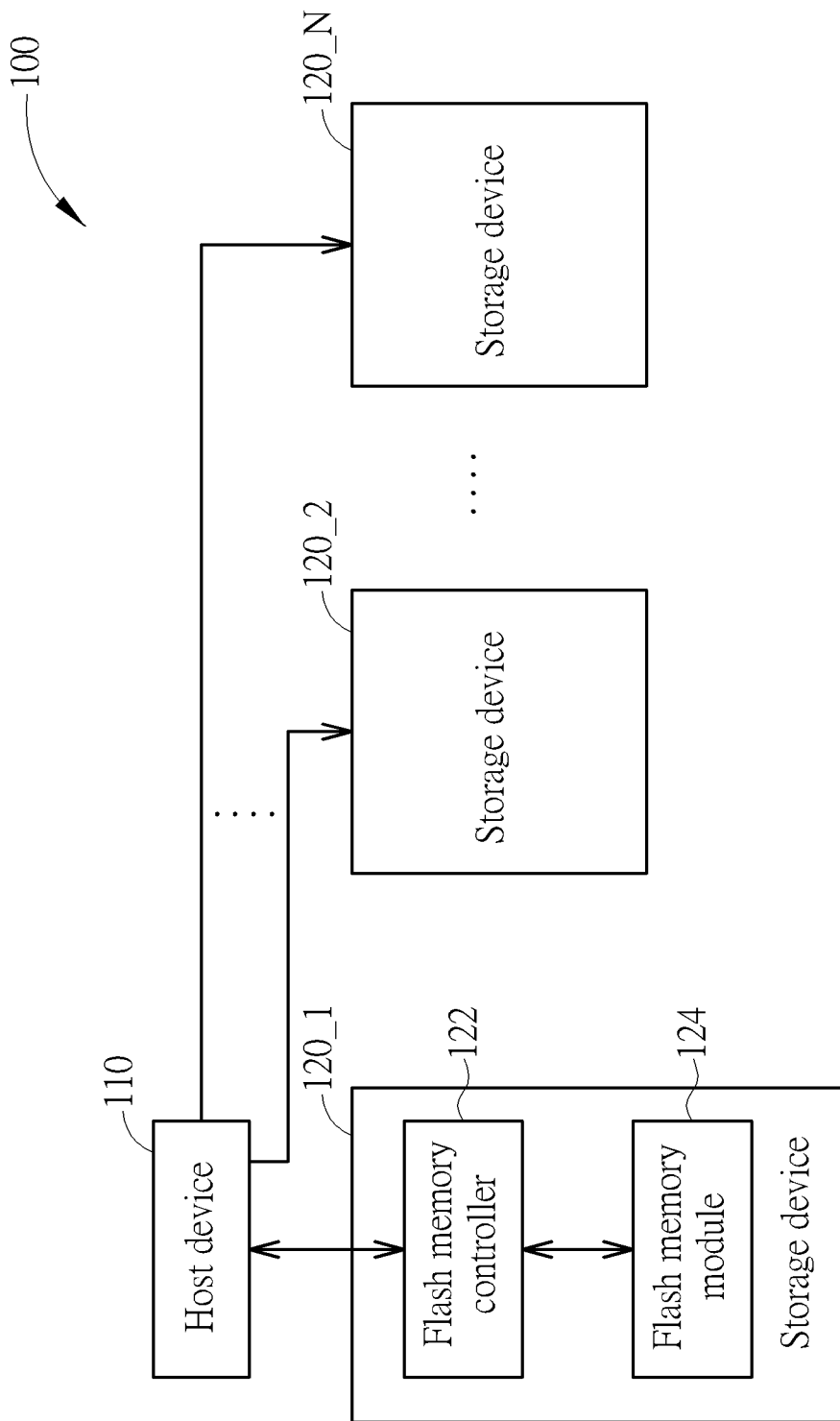
FIG. 1 is a diagram illustrating an electronic device according to an embodiment of the present invention.

FIG. 1 is a diagram illustrating an electronic device 100 according to an embodiment of the present invention. As shown in FIG. 1, the electronic device 100 comprises a host device 110 and a plurality of storage devices 120_1-120_N. Each storage device (e.g., storage device 120_1) includes a flash memory controller 122 and a flash memory module 124. In the present embodiment, each of the plurality of storage devices 120_1-120_N can be a solid-state drive (SSD) or any storage device having a flash memory module. The host device 110 can be a central processing unit or other electronic devices or components that can be used to access the storage devices 120_1-120_N. The electronic device 100 can be a server, a personal computer, a laptop computer or any portable electronic device. It should be noticed that although a plurality of storage devices 120_1-120_N are shown in FIG. 1, in some embodiments, the electronic device 100 may only have a single storage device 120_1.

Figure 2:
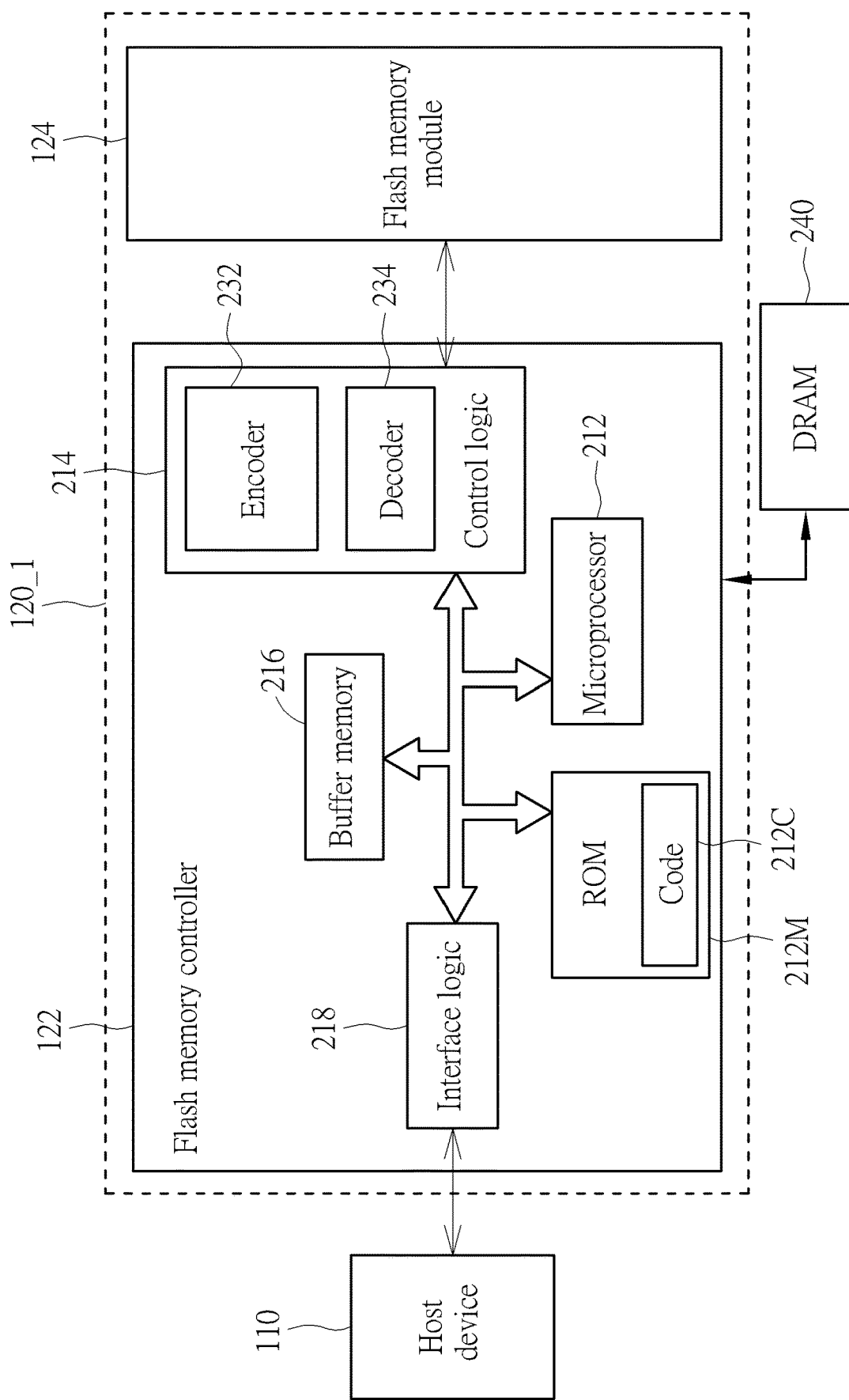
FIG. 2 is a diagram illustrating a flash memory controller in a storage device according to an embodiment of the present invention.

FIG. 2 is a diagram illustrating the storage device 120_1 according to an embodiment of the present invention. As shown in FIG. 2, the flash memory controller 122 comprises a microprocessor 212, a read only memory (ROM) 212M, a control logic 214, a buffer memory 216 and an interface logic 218. The read only memory 212M is configured to store a code 212C, and the microprocessor 212 is configured to execute the code 212C to control access of the flash memory module 124. The control logic 214 includes an encoder 232 and a decoder 234, wherein the encoder 232 is configured to encode data which is written in the flash memory module 124 to generate a corresponding check code (also known as an error correction code (ECC)), and the decoder 234 is configured to decode data read from the flash memory module 124.

In a general situation, the flash memory module 124 includes a plurality of flash memory chips, and each flash memory chip includes a plurality of blocks. The flash memory controller 122 performs a block-based erase operation upon the flash memory module 124. In addition, a block can record a specific number of pages, wherein the flash memory controller 122 performs a page-based write operation upon the flash memory module 124. In the present embodiment, the flash memory module 124 is a 3D NAND-type flash memory module.

In practice, through the microprocessor 212 executing the code 212C, the flash memory controller 122 may use its own internal components to perform many control operations. For example, the flash memory controller 122 uses the control logic 214 to control access of the flash memory module 124 (especially access of at least one block or at least one page), uses the buffer memory 216 to perform a required buffering operation, and uses the interface logic 218 to communicate with a host device 110. The buffer memory 216 is implemented by a random access memory (RAM).

For example, the buffer memory 216 may be a static RAM (SRAM), but the present invention is not limited thereto. In addition, the flash memory controller 122 is coupled to a dynamic random access memory (DRAM) 240. It should be noticed that a DRAM 240 may also be included in the flash memory controller 122. For example, the DRAM 240 and the flash memory controller 122 may coexist in the same package.

In one embodiment, the storage device 120_1 conforms to the NVme specification. That is, the interface logic 218 conforms to a specific communication specification such as a peripheral component interconnect (PCI) specification or a PCI-Express (PCIe) specification, and performs communication according to the specific communication specification. For example, the interface logic 218 communicates with the host device 110 via a connector.

Figure 3:
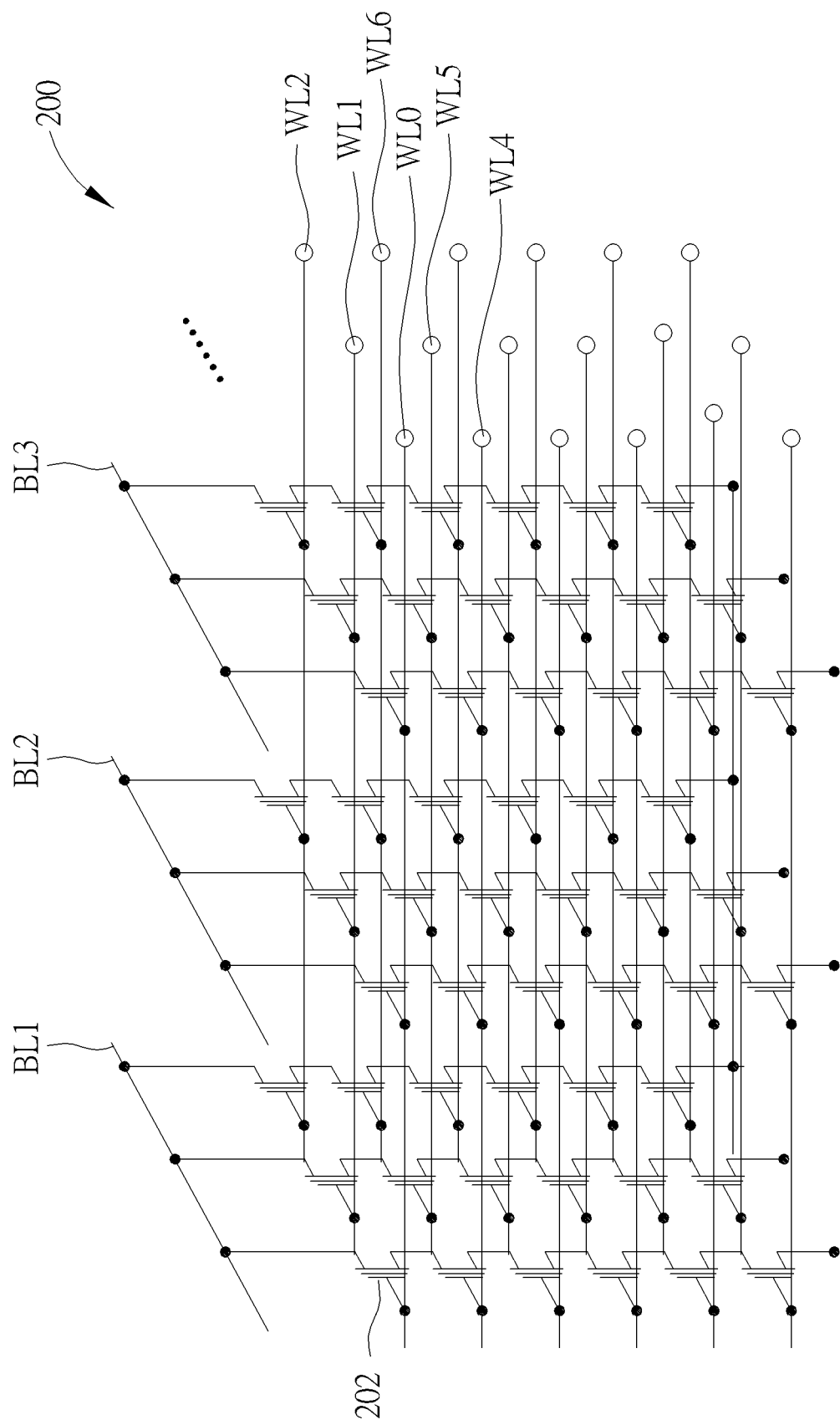
FIG. 3 is a diagram illustrating a block in a flash memory module according to an embodiment of the present invention.

FIG. 3 is a diagram illustrating a block 200 of the flash memory module 124 according to an embodiment of the present invention, wherein the flash memory module 124 is a 3D NAND-type flash memory module. As shown in FIG. 3, the block 200 includes a plurality of memory cells, such as floating gate transistors 202 shown in FIG. 3 or other charge trapping components. A 3D NAND-type flash memory structure is formed through a plurality of bit lines (only BL1-BL3 are shown in FIG. 3) and a plurality of word lines (e.g., WL0-WL2 and WL4-WL6 shown in FIG. 3). Taking a top plane in FIG. 3 as an example, all floating gate transistors on the word line WL0 form at least one page, all floating gate transistors on the word line WL1 form at least another one page, all floating gate transistors on the word line WL2 form at least yet another one page, and so on. In addition, the definition between the word line WL0 and the page (logic page) may vary depending on a writing method of the flash memory. In detail, when data are stored using a Single-Level cell (SLC) means, all floating gate transistors on the word line WL0 correspond to only one logic page; when data are stored using a Multi-Level cell (MLC) means, all floating gate transistors on the word line WL0 correspond to two logic pages; when data are stored using a Triple-Level cell (TLC) means, all floating gate transistors on the word line WL0 correspond to three logic pages; and when data are stored using a Quad-Level cell (QLC) means, all floating gate transistors on the word line WL0 correspond to four logic pages. The 3D NAND-type flash memory structure and the relationship between word lines and pages are obvious to those skilled in the art. For simplification, no further illustration is provided.

Figure 4:
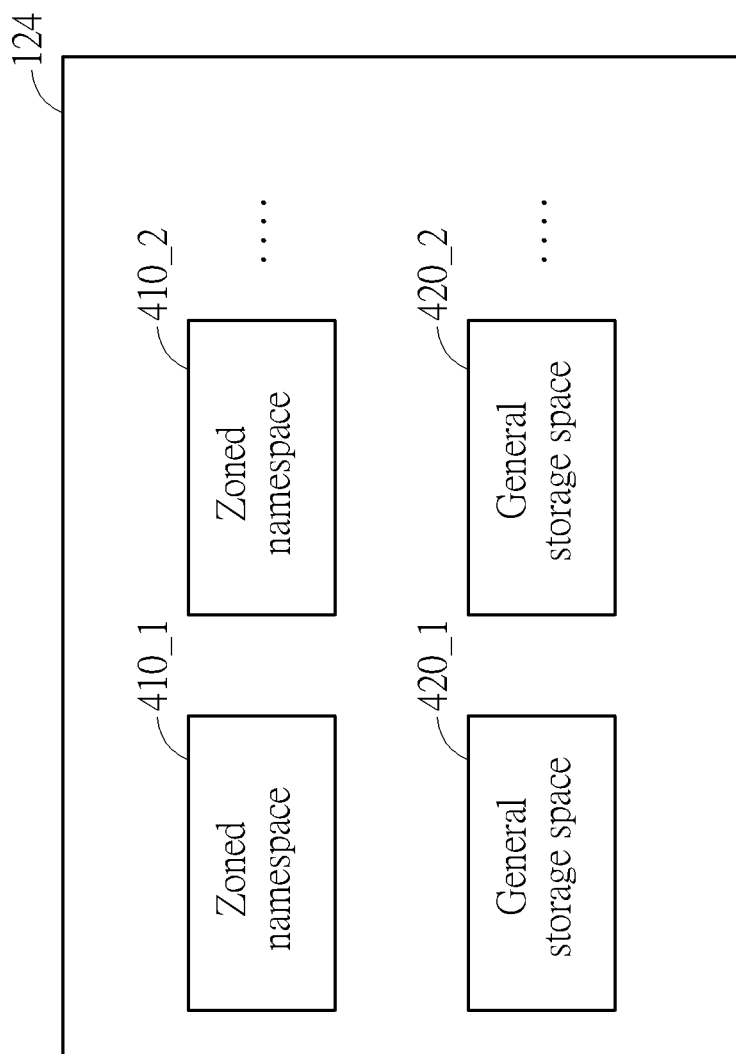
FIG. 4 is a diagram illustrating the flash memory module comprising a general storage space and a zoned namespace.
Figure 5:
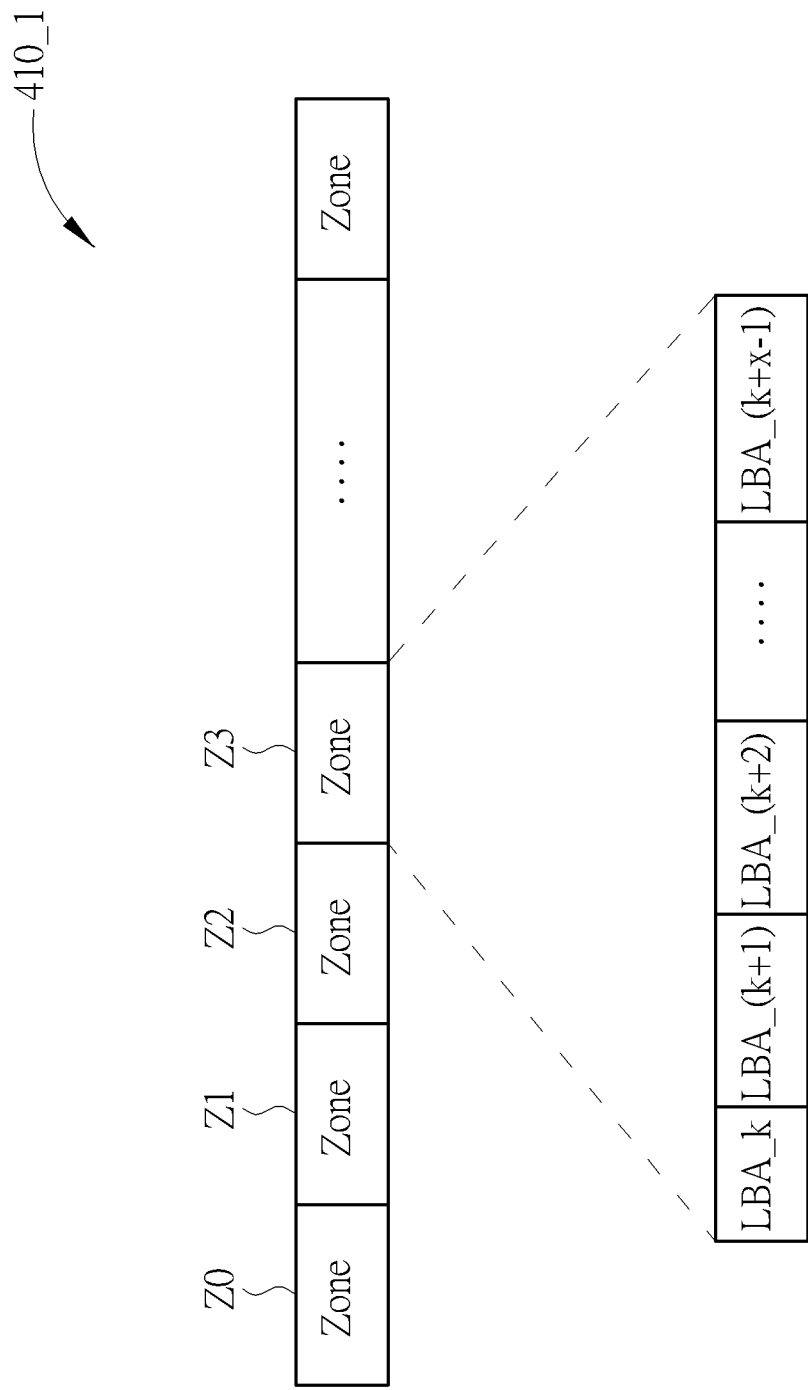
FIG. 5 is a diagram illustrating the zoned namespace divided into multiple zones.

In the present embodiment, the host device 110 can configure at least a part of the flash memory module 124 as a zoned namespace by sending a settling command set, such as a zoned namespace command set. Referring to FIG. 4, the host device 110 can send a settling command set to the flash memory controller 122, such that the flash memory module 124 has at least one zoned namespace (in the present embodiment, taking the zoned namespaces 410_1 and 410_2 as examples) and at least one general storage space (in this embodiment, taking the general storage spaces 420_1 and 420_2 as examples). The zoned namespace 410_1 is divided into multiple zones for access, and the host device 110 must perform a logical block address (LBA)-based data writing operation in the zoned namespace 410_1. A logical block address (or logical address in brief) can represent one 512-byte data or one 4-kilobyte data, and the host device 110 needs to continuously write data to a zone. Specifically, referring to FIG. 5, the zoned namespace 410_1 is divided into multiple zones (e.g., zones Z0, Z1, Z2, Z3, etc.), where the size of the zone is set by the host device 110, but the size of each zone is the same. The logical addresses within each zone must be continuous, and there will be no overlapping logical addresses between the zones, that is, one logical address can only exist in one zone. For example, if the size of each zone is "x" logical addresses, and the starting logical address of the zone Z3 is LBA_k, then the zone Z3 is used to store data with the logical addresses LBA_k, LBA_(k+1), LBA_(k+2), LBA_(k+3), . . . , LBA_(k+x−1). In one embodiment, the logical addresses of adjacent zones are also continuous. For example, the zone Z0 is used to store data with logical addresses LBA_1-LBA_2000, the zone Z1 is used to store data with logical addresses LBA_2001-LBA_4000, the zone Z2 is used to store data with logical addresses LBA_4001-LBA_6000, the zone Z3 is used to store data with logical addresses LBA_6001 LBA_8000, and so on. In addition, the amount of data corresponding to a logical address can be determined by the host device 110. For example, the amount of data corresponding to one logical address can be 4 kilobytes (KB).

In addition, when being written in each zone, the data is written according to the sequence of the logical addresses of the data. In detail, the flash memory controller 122 sets a write point according to the written data to control the writing sequence of the data. In detail, assuming that the zone Z1 is used to store data with logical addresses LBA_2001-LBA_4000, after the host device 110 transmits the data corresponding to the logical addresses LBA_2001-LBA_2051 to the flash memory controller 122, the flash memory controller 122 sets the write point to the next logical address LBA_2052. If the host device 110 subsequently transmits data belonging to the same zone but does not have the logical address LBA_2052, for example, the host device 110 transmits data with the logical address LBA_3000, the flash memory controller 122 rejects the data writing operation and returns the message of writing failure to the host device 110; in other words, only when the logical address of the received data is the same as the logical address pointed to by the write point, the flash memory controller 122 allows the data writing operation. In addition, if data in multiple zones are written alternately, each zone can have its own write point.

In addition, the NVMe specification provides a deallocate command that is sent from the host device 110 to ask for deleting the data corresponding a range of logical addresses, and the NVMe specification further indicates that a flash memory controller can recommend the host device 110 to perform a reset command to control the zone from a full state to an empty state. Therefore, the following embodiments are proposed so that the flash memory controller 122 can efficiently and correctly recommend the host device 110 to perform the reset command.

Figure 6:
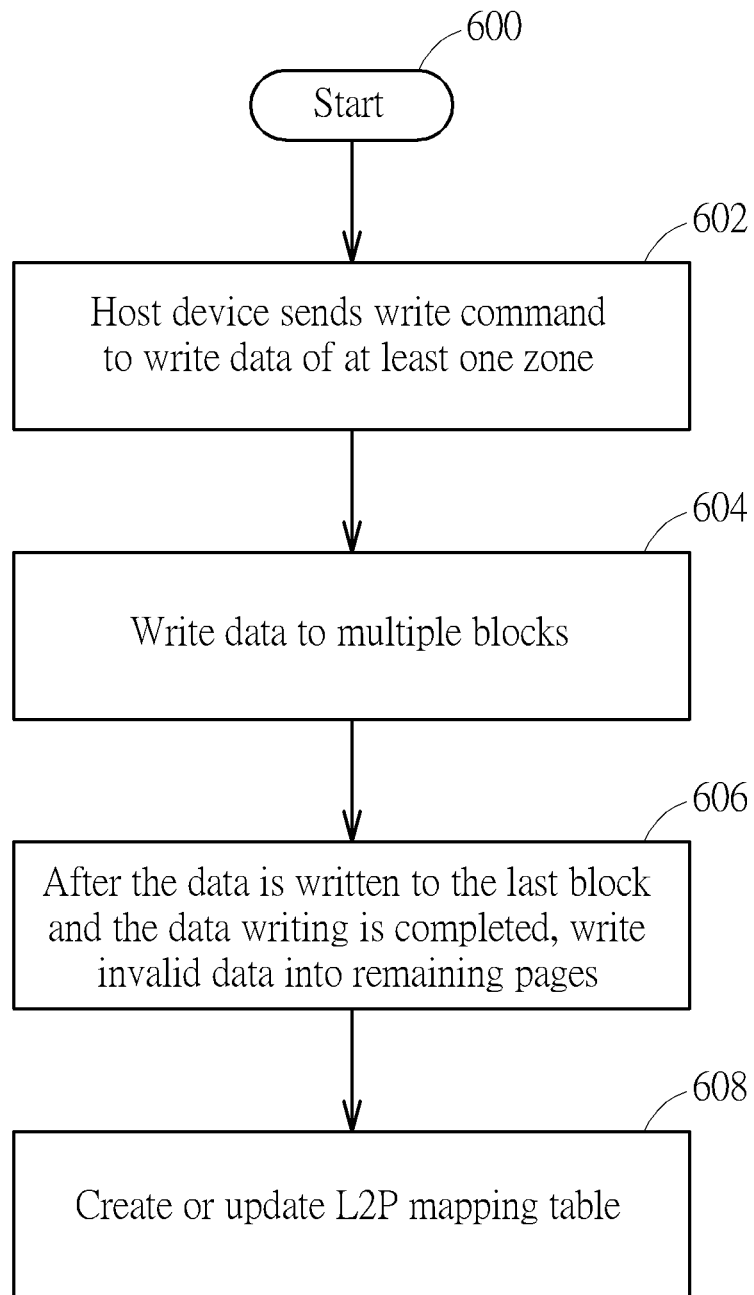
FIG. 6 is a flowchart illustrating writing data from a host device to the zoned namespace according to an embodiment of the present invention.

FIG. 6 is a flowchart illustrating writing data from the host device 110 to the zoned namespace 410_1 according to an embodiment of the present invention. In the present embodiment, it is assumed that the amount of data corresponding to each zone is greater than the size of each physical block in the flash memory module 124, and the amount of data corresponding to each zone is not an integer multiple of the size of each physical block in the flash memory module 124. In step 600, the flow starts, and the host device 110 and the storage device 120_1 are powered on and an initialization operation is completed. The host device 110 sets basic settings for at least a portion of the storage zone of the storage device 120_1 (e.g., a size of each zone, a number of zones and a logical block address size) by using, for example, a zoned namespaces command set. In step 602, the host device 110 sends a write command and corresponding data to the flash memory controller 122, where the above-mentioned data is data corresponding to one or more zones, such as the data corresponding to the logical addresses LBA_k-LBA_(k+x−1) in the zone Z3 in FIG. 5. In step 604, the flash memory controller 122 selects at least one block (e.g., a blank block, also known as a spare block) from the flash memory module 124, and writes data from the host device 110 to the at least one block in sequence. Since the size of the zone set by the host device 110 is very difficult to match the size of the physical block, after the host device 110 sends the write commands to all the logical addresses in the zone Z3, the data to be written by the host device 110 usually cannot fully fill the storage space of the physical block. In other words, the data storage capacity corresponding to a zone is usually not an integer multiple of the size of the zone in a physical block used to store the data written by the host device 110. In step 606, after the data is written to the last block and the data writing is completed, the flash memory controller 122 writes invalid data into remaining pages of the last block, or directly keeps the remaining pages blank. It should be noticed that each block usually reserves several pages to store system management information, including a write time table, a physical address to logical address mapping table, the check bit of error correction code and the redundant array of independent disks (RAID) parity, etc. The remaining pages mentioned above represent the pages remained after the system management information and the data to be stored by the host device 110 are written into the last block.

Figure 7:
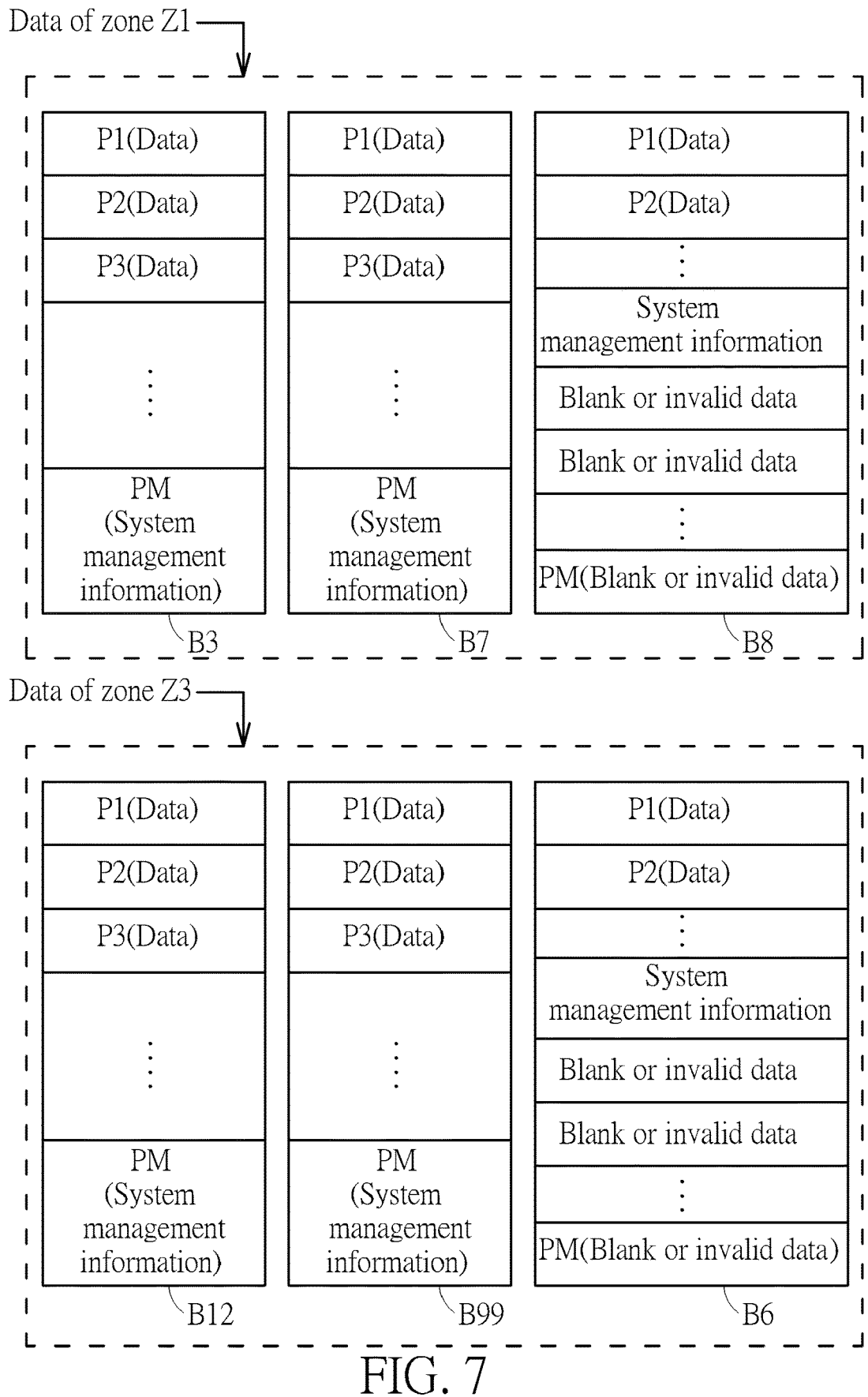
FIG. 7 is a diagram illustrating the zone data written to the blocks in the flash memory module.

For example, referring to FIG. 7, assuming that the amount of data corresponding to each zone is between two blocks and three blocks in the flash memory module 124, the flash memory control 122 can sequentially write the data of the zone Z1 into the blocks B3, B7 and B8 in response to the write command sent by the host device 110 for the zone Z1. It should be noticed that, in one embodiment, the write command sent by the host device 110 for the zone Z1 comprises the starting logical address of the zone Z1, and the flash memory controller 122 maps the starting logical address of the zone Z1 to the starting physical storage space of the physical block B3, such as the first physical page, and the flash memory controller 122 stores the data corresponding to the starting logical address of the zone Z1 into the initial physical storage space of the physical block B3, such as the first physical page. The blocks B3, B7 and B8 all contain the pages P1-PM, and the data in the zone Z1 is written sequentially from the first page P1 to the last page PM of the block B3 according to the logical addresses. After the data in the block B3 is written, the writing operation continues from the first page P1 to the last page PM of the block B7. It should be noticed that even if the host device 110 continuously performs the writing operation regarding the logical addresses in the zone Z1, the flash memory controller 122 can still select the discontinuous blocks B3 and B7 to store the data which is continuous in logic addresses. After the data is written in the block B7, the data is continuously written to the first page P1 of the block B8 until the end of the data of the zone Z1; in addition, the remaining pages in the block B8 keep blank or have invalid data written therein. Similarly, the flash memory controller 122 can sequentially write the data of the zone Z3 to the blocks B12, B99 and B6, where the blocks B12, B99 and B6 all comprise the pages P1-PM, and the data of the zone Z3 is written sequentially, starting from the first page P1 to the last page PM of the block B12 according to the logical addresses. After the data in block B12 is written, the data is continuously written, starting from the first page P1 to the last page PM of the block B99, and after the data in block B99 is written, the data is continuously written, starting from the first page P1 of the block B6 until the end of the data of the zone Z3. In addition, the remaining pages of the block B6 keep blank or have invalid data written therein. It should be noticed that the flash memory controller 122 may not establish a logical page to physical page mapping relationship for the physical pages with the invalid data stored therein. The flash memory controller 122 usually sets physical blocks having blank physical pages or having physical pages with invalid data to correspond to the last portion of each zone. In other words, the flash memory controller 122 stores the data corresponding to the last logical address of the zone in a physical block with blank pages or invalid data.

In step 608, the flash memory controller 122 creates or updates an L2P mapping table to record the mapping relationship between the logical addresses and the physical addresses for subsequent data reading from the zoned namespace 410_1. FIG. 8 is a diagram illustrating an L2P mapping table 800 according to an embodiment of the present invention. The L2P mapping table 800 includes two fields. One field records the starting logical addresses of the zones, and the other field records the physical block addresses of the blocks. Please refer to FIG. 8 in conjunction with FIG. 7. Since the data of zone Z1 is written to blocks B3, B7 and B8 in sequence and the data of the zone Z3 is written to the blocks B12, B99 and B6 in sequence, the L2P mapping table 800 records the starting logical address Z1_LBA_S of the zone Z1 and the physical block addresses PBA3, PBA7 and PBA8 of the blocks B3, B7 and B8, and the starting logical address Z3_LBA_S of the zone Z3 and the physical block addresses PBA12, PBA99 and PBA6 of the blocks B12, B99 and B6 are recorded. For example, assuming that the zone Z1 is configured to store data with logical addresses LBA_2001-LBA_4000, and the zone Z3 is configured to store data with logical addresses LBA_6001-LBA_8000, the starting logical address Z1_LBA_S of the zone Z1 is also LBA_2001, and the starting logical address Z3_LBA_S of the zone Z3 is also LBA_6001. Please notice that the steps in the flowchart for writing data from the host device 110 to the zoned namespace 410_1 do not have to be performed in a fixed order as long as they can achieve the same purpose. For example, the step 608 can be performed after the step 602. Those skilled in the art can understand it under the teaching of the present invention. It should be noticed that, in the present embodiment, each physical block corresponds to only one zone. For example, the blocks B3, B7 and B8 correspond to only the zone Z1, and the blocks B12, B99 and B6 correspond to only the zone Z3. In other words, a single block stores only data in a single zone. For example, the blocks B3, B7 and B8 store only data corresponding to the zone Z1, and blocks B12, B99 and B6 only store data corresponding to the zone Z3.

It is noted that the L2P mapping table 800 shown in FIG. 8 is for illustrative purposes only. In other embodiments of the present invention, the L2P mapping table may comprise each logical address and corresponding physical address, or the L2P mapping table may comprise many physical addresses and corresponding logical address ranges.

In addition, the flash memory controller 122 may establish a valid page count table that records a number of valid page (s) within the block, wherein the valid page represents that the data is not old data (i.e. the flash memory module 124 does not have other data with the same logical address for updating the old data). FIG. 9 shows a valid page count table 900 according to one embodiment of the present invention. As shown in FIG. 9, it is assumed that the valid page count table 900 includes the information immediately after the data of the zones Z1 and Z3 are written into the flash memory module 124 completely, and valid page counts of the physical blocks B3, B7 and B8 corresponding to the zone Z1 are "128", "128" and "60", respectively, and the valid page counts of the physical blocks B12, B99 and B6 corresponding to the zone Z3 are "128", "128" and "60", respectively. In one embodiment, the valid page count table 900 is temporarily stored in the buffer memory 216.

Then, if the flash memory controller 122 receives the deallocate command from the host device 110 to deallocate the data corresponding a logical address range, the microprocessor 212 will update the L2P table to remove the information of the logical address range so that the data corresponding the logical address range can be regarded as invalid data, for example, the L2P mapping table is updated to remove the corresponding physical address of the logical address range, or the L2P mapping table is updated to note that the logical address range does not have corresponding physical addresses. Then, the microprocessor 212 updates the valid page count table 900 based on the page numbers corresponding the logical address range. For example, if the deallocate command from the host device 110 indicates a logical address range corresponding to data of the thirty pages within the block B3, the valid page count table 900 is updated so that the valid page count of the block B3 is "98".

In addition, the microprocessor 212 can check the valid page count table 900 and a zone-block mapping table to determine if any one of the zones does not have any valid data, wherein the zone-block mapping table may comprise the information about each zone and corresponding physical blocks, taking FIG. 7 as an example, the zone Z1 corresponds to the blocks B3, B7 and B8, and the zone Z3 corresponds to the blocks B12, B99 and B6. In one embodiment, the L2P mapping table 800 may serve as the zone-block mapping table. Specifically, if the microprocessor 212 detects that there is no valid data within the blocks B3, B7 and B8 corresponding to the zone Z1 (i.e., the valid page count of each of the B3, B7 and B8 is equal to zero), the microprocessor 212 can actively notify the host device 110 to recommend the host device 110 to perform a reset command to control the zone Z1 from a full state to an empty state. Only after receiving the reset command, the microprocessor 212 can erase the blocks B3, B7 and B8 and to set the blocks B3, B7 and B8 to be spare blocks (blank blocks) for storing other data.

In one embodiment, the flash memory controller 122 may further have a plurality registers, wherein each of the registers is used to store a reset zone recommended attribute of a zone, and the reset zone recommended attribute indicates if the flash memory controller 122 detects that there is no valid data within the zone. Specifically, if the microprocessor 212 detects that there is no valid data within the blocks B3, B7 and B8 corresponding to the zone Z1, the microprocessor 212 can set the register corresponding to the zone Z1 to be "1", and once the host device 110 detects that the register corresponding to the zone 21 has the value "1", the host device 110 may consider if sending a reset command to the flash memory controller 122.

In another embodiment, if the microprocessor 212 detects that there is no valid data within the blocks B3, B7 and B8 corresponding to the zone Z1, the flash memory controller 122 can actively send a zone descriptor changed event for the zone Z1 to the host device 110, to recommend the host device 110 to send a reset command to reset the zone.

Figure 10:
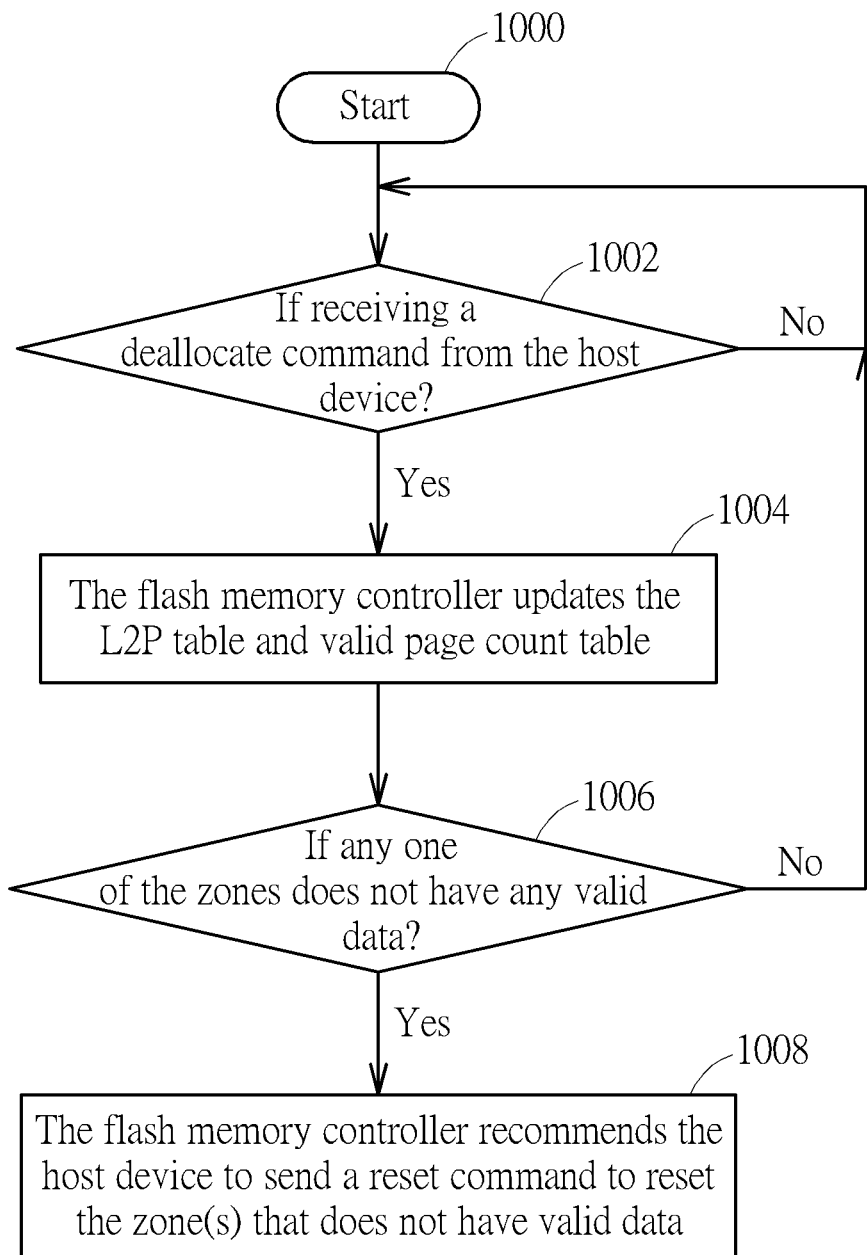
FIG. 10 is a flowchart of a control method of the flash memory controller according to one embodiment of the present invention.

FIG. 10 is a flowchart of a control method of the flash memory controller 122 according to one embodiment of the present invention. Referring to the above embodiments of FIGS. 6-9 together, the flow is described as follows.

Step 1000: the flow starts.

Step 1002: the flash memory controller determines if receiving a deallocate command from the host device, and if yes, the flow enters Step 1004; and if not, the flow stays at Step 1002.

Step 1004: the flash memory controller updates the L2P table and valid page count table.

Step 1006: the flash memory controller refers to the valid page count table to determine if any one of the zones does not have any valid data, and if yes, the flow enters Step 1008; and if not, the flow goes back to Step 1002.

Step 1008: the flash memory controller recommends the host device to send a reset command to reset the zone (s) that does not have valid data.

Figure 11:
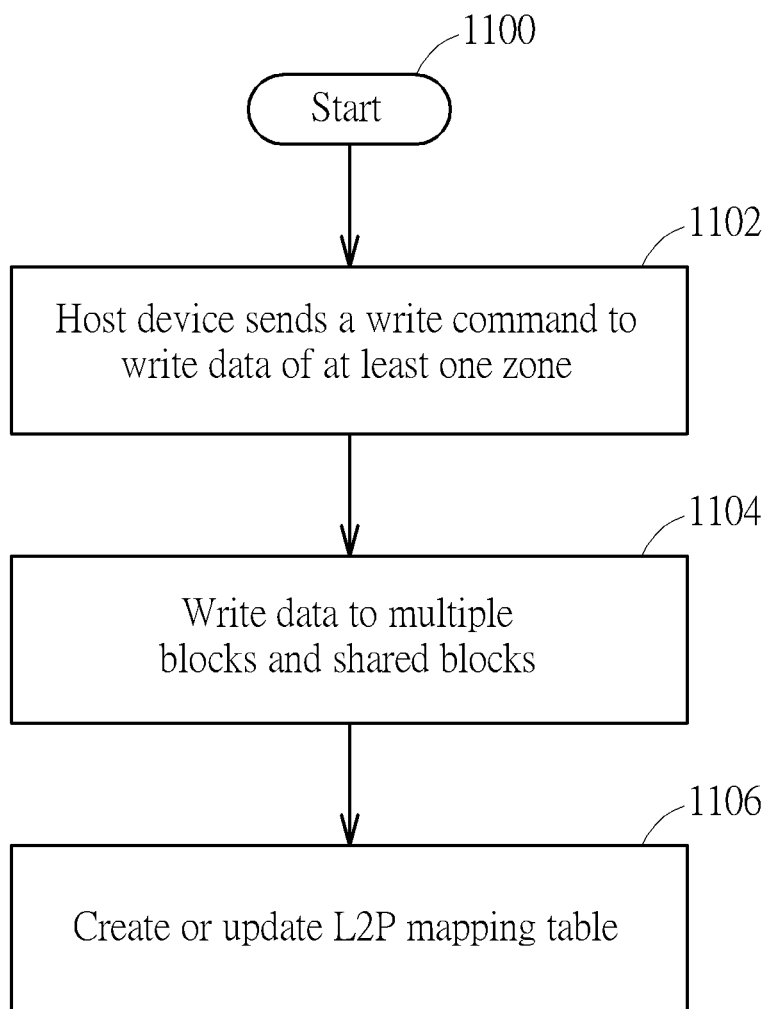
FIG. 11 is a flowchart illustrating writing data from the host device to the zoned namespace according to another embodiment of the present invention.
Figure 12:
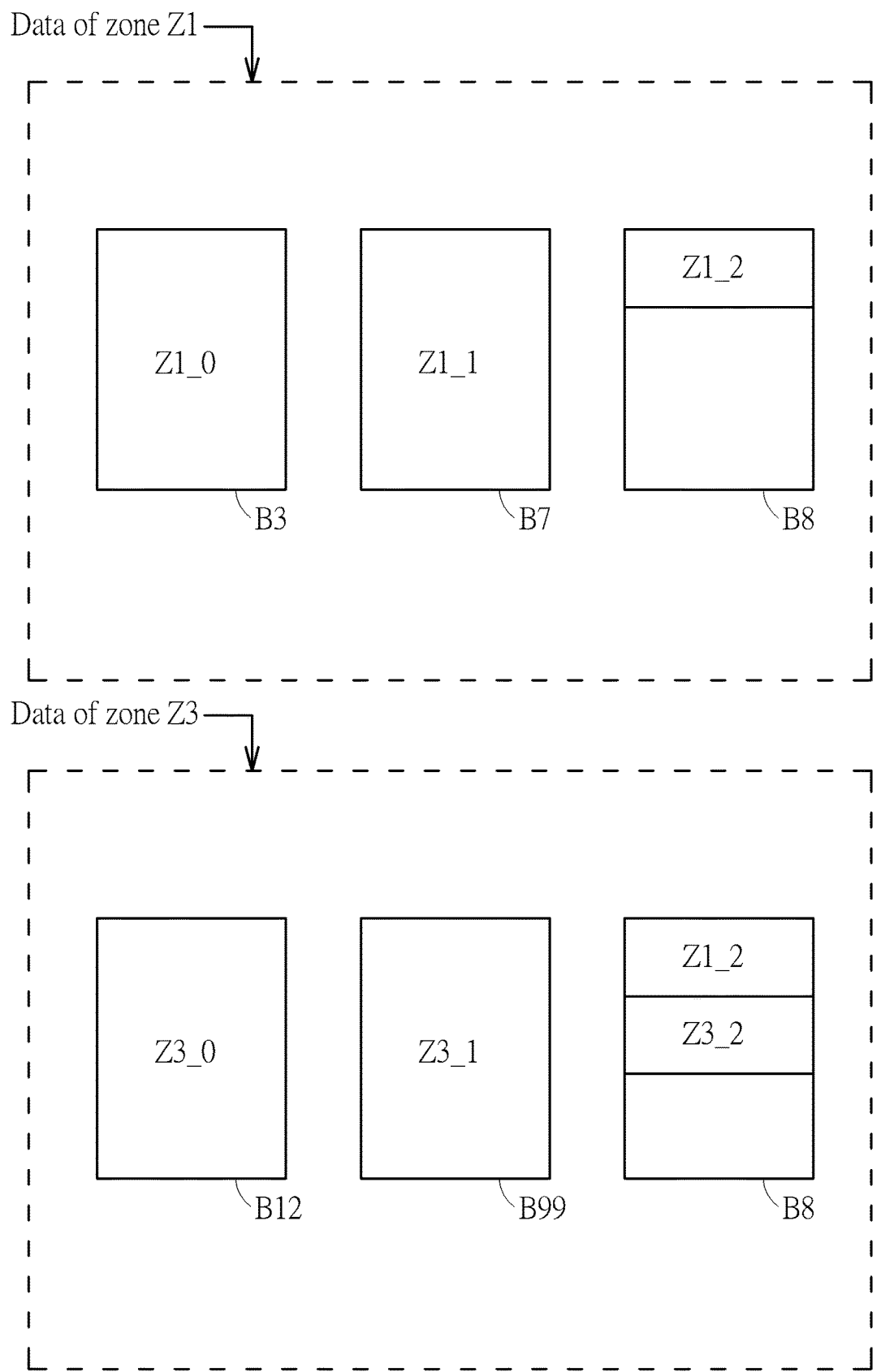
FIG. 12 is a diagram illustrating the zoned namespace divided into multiple zones.

FIG. 11 is a flowchart illustrating writing data from the host device 110 to the zoned namespace 410_1 according to another embodiment of the present invention. In the present embodiment, it is assumed that the amount of data corresponding to each zone is greater than the size of each block in the flash memory module 124, and the amount of data corresponding to each zone is not an integer multiple of the size of each block in the flash memory module 124. In step 1100, the flow starts. The host device 110 and the storage device 120_1 are powered on and the initialization operation is completed. The host device 110 sets the storage device 120_1 with basic settings (e.g., the size of each zone, the number of zones and the size of the logical block address) by using, for example, the zoned namespaces command set. In step 1102, the host device 110 sends a write command and corresponding data to the flash memory controller 122, where the above-mentioned data is data corresponding to one or more zones, such as the data corresponding to the logical addresses LBA_k–LBA_(k+x−1) of the zone Z3 in FIG. 5. In step 1104, the flash memory controller 122 selects at least one block (e.g., a blank block, also known as a spare block) from the flash memory module 124, or selects at least one blank block or at least one shared block, to write data from the host device 110 into these blocks in sequence. For example, referring to FIG. 12, assuming that the amount of data corresponding to each zone is between 2-3 blocks in the flash memory module 124, the flash memory controller 122 can write the data of the zone Z1 into the blocks B3, B7 and B8 in sequence, where the block B3 records the first partial data Z1_0 of the zone Z1, and the block B7 records the second partial data Z1_1 of the zone Z1, and the block B8 records the third partial data Z1_2 of the zone Z1. In this embodiment, since all data stored in the blocks B3 and B7 are data in the zone Z1 and only part of the pages in the block B8 store data in the zone Z1, in order to take advantage of the remaining pages in the block B8, the microprocessor 212 sets the block B8 as a shared block, that is, the remaining pages of the block B8 can be used to store data of the other zones. Referring to FIG. 12, the flash memory controller 122 is preparing to write the data of the zone Z3 into the zoned namespace 410_1, and since there is a remaining space in the shared block B8, the microprocessor 212 selects two blank blocks B12, B99 and the share block B8 to store data in the zone Z3. Specifically, the flash memory controller 122 sequentially writes the data of the zone 23 into the blocks B12, B99 and B8. The block B12 records the first partial data Z3_0 of the zone Z3, the block B99 records the second partial data Z3_1 of the zone Z3, and the block B8 records the third partial data Z3_2 of the zone Z3. In this embodiment, all data stored in the blocks B12 and B99 are data of the zone Z3, and the block B8 records both of the third partial data Z1_2 of the zone Z1 and the third partial data Z3_2 of the zone Z3. Please notice that, for the convenience of management, the flash memory controller 122 does not store the first data of any zone in the shared block because this will increase the complexity of creating the L2P mapping table via the flash memory controller 122. The flash memory controller 122 stores the first data of each zone in an exclusive block, such as the blocks B3 and B12. These exclusive blocks only store data belonging to the same zone, so they are called exclusive blocks. The last data of any zone (which corresponds to the data of the last logical address of the zone) will be stored in a shared block, such as block B8, and the last data of another zone will also be stored in the shared block. In this embodiment, the shared block stores data of more than one zone. To put it another way, the shared block stores the last data of more than one zone, and the exclusive block only stores data in a single zone.

In step 1106, the flash memory controller 122 creates or updates an L2P mapping table to record the mapping relationship between the logical addresses and the physical addresses, and creates a shared block table for subsequent data reading from the zoned namespace 410_1. FIG. 13 is a diagram illustrating the L2P mapping table 1300 and a shared block table 1330 according to an embodiment of the present invention. The L2P mapping table 1300 comprises two fields. One field records the logical addresses, and the other field records the physical block addresses of the blocks. Please refer to FIG. 13 in conjunction with FIG. 12. Since the data of the zone Z1 is written to the blocks B3, B7 and B8 in sequence, and the data of the zone Z3 is written to the blocks B12, B99 and B8 in sequence, the L2P mapping table 1100A records the starting logical address Z1_LBA_S of the zone Z1 and the physical block address PBA3 of the block B3, and the logical address (Z1_LBA_S+y) of the zone Z1 and the physical block address PBA7 of the block B7, and the logical address (Z1_LBA_S+2*y) of the zone Z1 and the physical block address PBA8 of the block B8. The logical address (Z1_LBA_S+y) can be the first logical address of the data written to the block B7 (that is, the first logical address of the second partial data Z1_1, which also corresponds to the logical address of the first page P1 of the block B7), and the logical address (Z1_LBA_S+2*y) can be the first logical address of the data written to the block B8 (that is, the first logical address of the third partial data Z1_2). Similarly, the L2P mapping table 1300 records the starting logical address Z3_LBA_S of the zone Z3 and the physical block address PBA12 of the block B12, the logical address (Z3_LBA_S+y) of the zone Z3 and the physical block address PBA99 of the block B99, and the logical address (Z3_LBA_S+2*y) of the zone Z6 and the physical block address PBA6 of the block B6, wherein the logical address (Z3_LBA_S+y) can be the first logical address of the data written to the block B99 (that is, the first logical address of the second partial data Z3_1, which also corresponds to the logical address of the first page P1 of the block B99), and the logical address (Z3_LBA_S+2*y) can be the first logical address of the data written to the block B8 (that is, the first logical address of the third partial data Z3_2). It should be noticed that the above "y" can represent how many pieces of data with different logical addresses from the host device that can be stored in a block. Please notice that after the host device 110 sets the zone size and the number of zones, the starting logical address of each zone is determined, and the starting logical address of each sub-zone is also determined, such as Z1_LBA_S, Z1_LBA_S+y, Z1_LBA_S+2*y, Z2_LBA_S, Z2_LBA_S+y, Z2_LBA_S+ 2*y, etc. Therefore, the L2P mapping table 1300 can be further simplified to have one field, that is, only one field of the physical block addresses, and the logical address field can be represented by entries of the table. There is no need to actually store the starting logical addresses of multiple sub-zones.

In addition, the shared block table 1330 comprises two fields, wherein one field records the logical addresses, and the other field records the physical block addresses corresponding to the logical addresses and the physical page addresses. In FIG. 13, the shared block table 1330 records the first logical address (Z1_LBA_S+2*y) of the third partial data Z1_2 of the zone Z1 and the corresponding physical block address PBA8 and the physical page address P1, that is, the data corresponding to the first logical address in the third partial data Z1_2 is written in the first page P1 of block B8. The shared block table 1330 records the first logical address (Z3_LBA_S+2*y) of the third partial data Z3_2 of the zone Z3 and the corresponding physical block address PBA8 and the physical page address P61. In other words, the data corresponding to the first logical address in the third partial data 23_2 is written in the $61^{th}$ page P61 of the block B8. Please notice that, it is assumed that each page in the block can store data of only one logical address. The actual situation can be adjusted, depending upon how many pieces of data with different logical addresses that can be stored in one page.

In addition, it should be noticed that in the process of writing the data of the zones Z1 and Z3, the writing process may not start to write the data of the zone Z3 to the zone namespace 410_1 after all data in the zone Z1 has been written to the zone namespace 410_1. In other words, it is possible that when the data in the zone Z1 has not been written completely, the flash memory controller 122 needs to start writing the data in the zone Z3 to the zone namespace 410_1. Therefore, in another embodiment of the present invention, the shared block table 1130 may additionally include a completion indicator field, which is used to indicate whether the data of the zone has been completely written in the shared block. The microprocessor 212 may refer to completion indicator of corresponding to the zone Z1 to determine if the data in the zone Z3 can be written into the block B8.

It is noted that the L2P mapping table 1300 and the shared block table 1330 shown in FIG. 13 are for illustrative purposes only. In other embodiments of the present invention, the L2P mapping table and the shared block table may comprise each logical address and corresponding physical address, or the L2P mapping table and the shared block table may comprise many physical addresses and corresponding logical address ranges.

Figure 14:
FIG. 14 shows a valid page count table according to one embodiment of the present invention.

In addition, the flash memory controller 122 may establish a valid page count table that records a number of valid page (s) within the block, wherein the valid page represents that the data is not old data (i.e. the flash memory module 124 does not have other data with the same logical address for updating the old data). FIG. 14 shows a valid page count table 1400 according to one embodiment of the present invention. As shown in FIG. 14, it is assumed that the valid page count table 1400 includes the information immediately after the data of the zones Z1 is written into the flash memory module 124 completely, but the data of the zones Z3 is not completely written into the block B8. The valid page counts of the physical blocks B3, B7 and B8 corresponding to the zone Z1 are "128", "128" and "86", respectively, and the valid page counts of the physical blocks B12, B99 and B8 corresponding to the zone Z3 are "128", "128"

and "128", respectively, wherein the third partial data Z1_2 of the zone Z1 has sixty pages in the block B8, and the third partial data Z3_2 of the zone Z3 temporarily has twenty-six pages in the block B8. In one embodiment, the valid page count table 1400 is temporarily stored in the buffer memory 216.

In addition, each shared block further has a detailed valid page count table for clearly indicating the valid page counts of the zones. FIG. 15 shows a detailed valid page count table 1500 according to one embodiment of the present invention, wherein the detailed valid page count table 1500 is for the shared block B8 shown in FIGS. 12-14. As shown in FIG. 15, the detailed valid page count table 1500 has four fields, zone number, starting physical page address, full information and valid page count, wherein the starting physical page address field record a starting physical page address of each zone, for example, the page P1 corresponding to the third partial data Z1_2 of the zone Z1, and the page P61 corresponding to the third partial data Z3_2 of the zone Z3. The full information field records if all of the data of the zone is completely written into the block B8, in this example, the data of the zones Z1 is written into the flash memory module 124 completely, but the data of the zones Z3 is not completely written into the block B8. The valid page count field records the current valid page count of each field, for example, the valid page count of the third partial data Z1_2 of the zone Z1 is "60", and the valid page count of the third partial data Z3_2 of the zone Z3 is "26".

Then, if the flash memory controller 122 receives the deallocate command from the host device 110 to deallocate the data corresponding a logical address range, the microprocessor 212 will update the L2P table to remove the information of the logical address range so that the data corresponding the logical address range can be regarded as invalid data, for example, the L2P mapping table is updated to remove the corresponding physical address of the logical address range, or the L2P mapping table is updated to note that the logical address range does not have corresponding physical addresses. Then, the microprocessor 212 updates the valid page count table 1400 and/or the detailed valid page count table 1500 based on the page numbers corresponding the logical address range. For example, if the deallocate command from the host device 110 indicates a logical address range corresponding to data of the thirty pages within the block B8, and the logical address range corresponds to the zone Z1, the valid page count table 1400 is updated so that the valid page count of the block B8 is "98", and the detailed valid page count table 1500 is updated so that the valid page count of the third partial data Z1_2 of the zone Z1 is "30".

In addition, the microprocessor 212 can check the valid page count table 1400, the detailed valid page count table 1500 and a zone-block mapping table to determine if any one of the zones does not have any valid data, wherein the zone-block mapping table may comprise the information about each zone and corresponding physical blocks, taking FIG. 12 as an example, the zone Z1 corresponds to the blocks B3, B7 and B8, and the zone Z3 corresponds to the blocks B12, B99 and B8. In one embodiment, the L2P mapping table 1300 may serve as the zone-block mapping table. Specifically, if the microprocessor 212 detects that there is no valid data within the blocks B3 and B7 corresponding to the zone Z1 (i.e., the valid page count of each of the B3 and B7 is equal to zero), and there is no valid data within the pages P1-P60 of the blocks B8 (i.e., the valid page count of the third partial data Z1_2 of the zone Z1 is equal to zero), and the detailed valid page count table 1500 indicates that all of the data of the zone Z1 has been completely written into the flash memory module 124, the microprocessor 212 can actively notify the host device 110 to recommend the host device 110 to perform a reset command to control the zone Z1 from a full state to an empty state. Only after receiving the reset command, the microprocessor 212 can erase the blocks B3 and B7 and to set the blocks B3 and B7 to be spare blocks (blank blocks) for storing other data. It is noted that, because the blocks B8 has the data of the zone Z3, the block B8 cannot be released to be the spare block even if the zone Z1 is reset.

It is noted that, in order to avoid wrongly determining that the zone does not have any valid data, the microprocessor 212 recommends the host device 110 to perform a reset command only when the full information field shown in FIG. 15 indicates that all of the data of the zone has been completely written into the flash memory module 124. Specifically, if the host device 110 sends one or more deallocate commands to deallocate the logical addresses corresponding to all of the written data of the zone Z3 (i.e., the logical addresses correspond to all of the pages within the blocks B12 and B99, and twenty-six pages of the block B8), but the full information field shown in FIG. 15 indicates that not all of the data of the zone Z3 is completely written into the flash memory module 124 (it means that the remaining data of the zone Z3 may be written into the block B8 after a period of time), the microprocessor 212 cannot recommend the host device 110 to perform the reset command to reset the zone Z3.

In one embodiment, the flash memory controller 122 may further have a plurality registers, wherein each of the registers is used to store a reset zone recommended attribute of a zone, and the reset zone recommended attribute indicates if the flash memory controller 122 detects that there is no valid data within the zone. In another embodiment, if the microprocessor 212 detects that there is no valid data within the blocks B3, B7 and B8 corresponding to the zone Z1, the flash memory controller 122 can actively send a zone descriptor changed event for the zone Z1 to the host device 110, to recommend the host device 110 to send a reset command to reset the zone.

Figure 16:
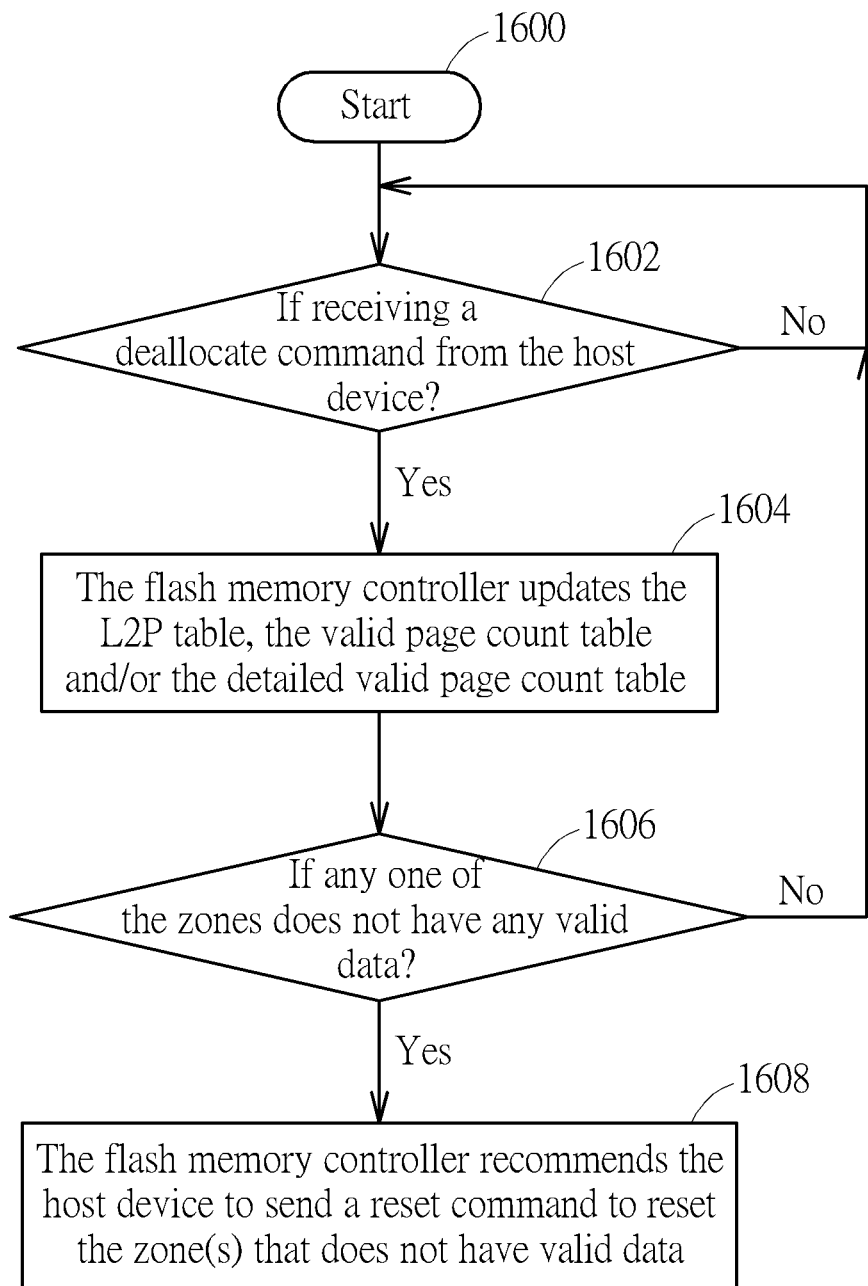
FIG. 16 is a flowchart of a control method of the flash memory controller according to one embodiment of the present invention.

FIG. 16 is a flowchart of a control method of the flash memory controller 122 according to one embodiment of the present invention. Referring to the above embodiments of FIGS. 11-15 together, the flow is described as follows.

Step 1600: the flow starts.

Step 1602: the flash memory controller determines if receiving a deallocate command from the host device, and if yes, the flow enters Step 1604; and if not, the flow stays at Step 1602.

Step 1604: the flash memory controller updates the L2P table, the valid page count table and/or the detailed valid page count table.

Step 1606: the flash memory controller refers to the valid page count table and the detailed valid page count table to determine if any one of the zones does not have any valid data, and if yes, the flow enters Step 1608; and if not, the flow goes back to Step 1602.

Step 1608: the flash memory controller recommends the host device to send a reset command to reset the zone (s) that does not have valid data.

In the embodiment shown in FIGS. 6-10, each block corresponds to only one zone, and the microprocessor 212 checks the valid page count table 900 and a zone-block mapping table to determine if any one of the zones does not have any valid data, to determine if recommending the host device 110 to send the reset command. In the embodiment shown in FIGS. 11-16, one block may correspond to more than one zone, so the microprocessor 212 checks the valid page count table 1400, the detailed valid page count table 1500 and a zone-block mapping table to determine if any one of the zones does not have any valid data, to determine if recommending the host device 110 to send the reset command. In another embodiment, the microprocessor 212 may establish a zone valid page count table based on the valid page count table 900, or based on the valid page count table 1400 and the detailed valid page count table 1500, to facilitate determining if any one of the zones does not have any valid data.

FIG. 17 is a diagram illustrating a zone valid page count table 1700 according to one embodiment of the present invention. As shown in FIG. 17, the zone valid page count table 1700 comprises information about the valid page count of each zone. In this embodiment, the zone valid page count table 1700 is immediately updated when the valid page count table 900 is updated, or the zone valid page count table 1700 is immediately updated when the valid page count table 1400 and/or the detailed valid page count table 1500 are updated. For example, if all of the data of each zone is written into 282 pages of the flash memory module 124, and if the valid page count table 900 is updated to reduce the valid page count corresponding to the zone Z1 due to a first deallocate command, the zone valid page count table 1700 is immediately updated based on the updated valid page count table 900 (e.g., valid page count of the zone Z1 is updated from "282" to "100"). Then, if the valid page count table 900 is further updated to reduce the valid page count corresponding to the zone Z1 due to a second deallocate command, the zone valid page count table 1700 is immediately updated based on the updated valid page count table 900 (e.g., valid page count of the zone Z1 is updated from "100" to "0"). Then, the microprocessor can determine if any one of the zones does not have any valid data based on the zone valid page count table 1700, without referring to the other table (s) such as the valid page count table 900/1400.

Figure 18:
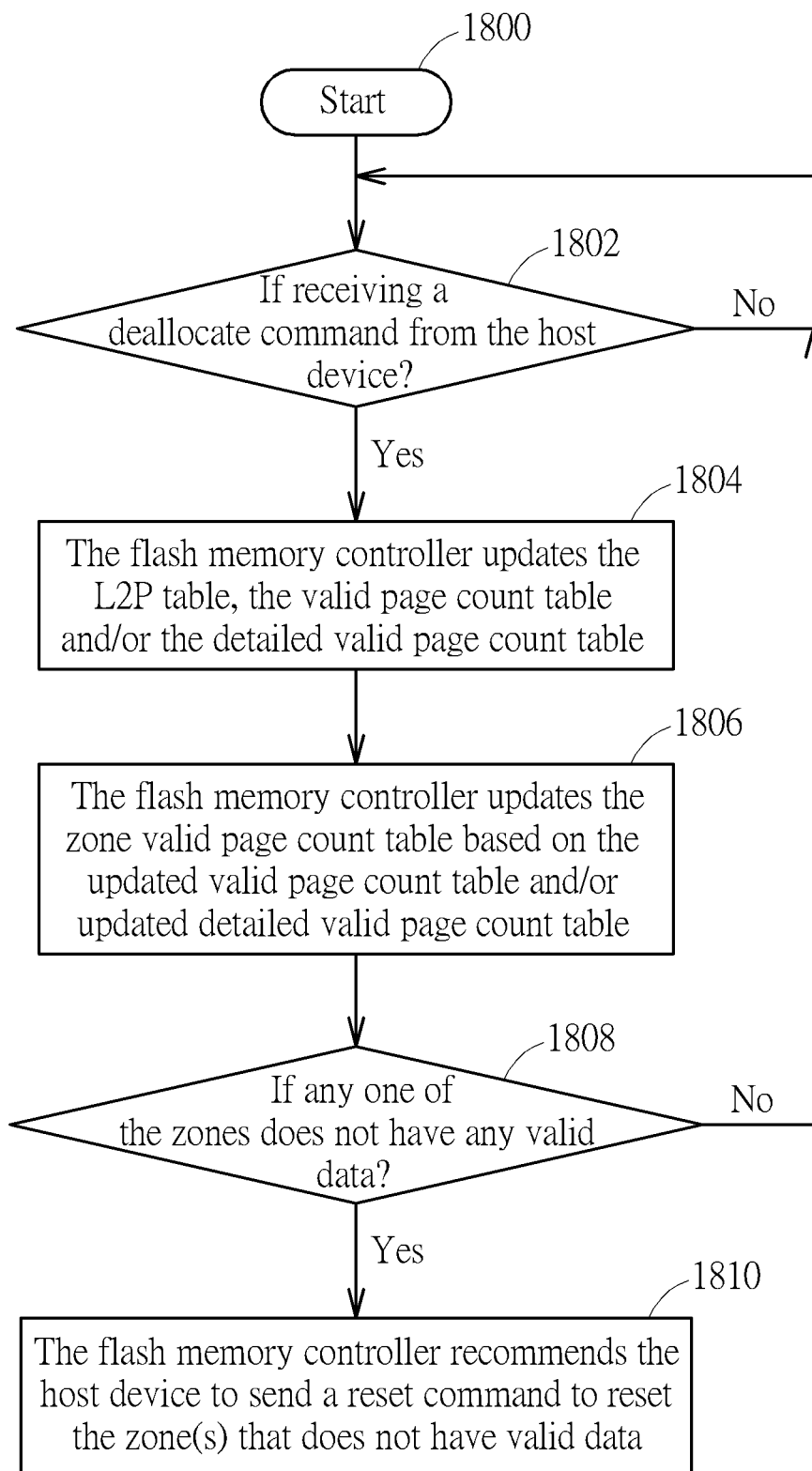
FIG. 18 is a flowchart of a control method of the flash memory controller according to one embodiment of the present invention.

FIG. 18 is a flowchart of a control method of the flash memory controller 122 according to one embodiment of the present invention. Referring to the above embodiments of FIG. 17 together, the flow is described as follows.

Step 1800: the flow starts.

Step 1802: the flash memory controller determines if receiving a deallocate command from the host device, and if yes, the flow enters Step 1804; and if not, the flow stays at Step 1802.

Step 1804: the flash memory controller updates the L2P table, the valid page count table and/or the detailed valid page count table.

Step 1806: the flash memory controller updates the zone valid page count table based on the updated valid page count table and/or updated detailed valid page count table.

Step 1808: the flash memory controller refers to the zone valid page count table to determine if any one of the zones does not have any valid data, and if yes, the flow enters Step 1810; and if not, the flow goes back to Step 1802.

Step 1810: the flash memory controller recommends the host device to send a reset command to reset the zone (s) that does not have valid data.

In the above embodiments, if the host device 110 sends a wrong deallocate command, the valid page count table 900/1400 and the zone valid page count table 1700 may have errors, causing the microprocessor 212 to make the wrong decision. For example, if the host device 110 sends a first deallocate command indicating a first logical address range, then the host device 110 sends a second deallocate command indicating a second logical address range which is partially overlapped with the first logical address range, the calculation of the valid page count may have errors. To solve this problem, the zone valid page count table may be modified to have a deallocate command history field, to record the state of each page. Specifically, referring to FIG. 19, which is a diagram illustrating a zone valid page mapping table 1900 according to one embodiment of the present invention. The zone valid page mapping table 1900 comprises deallocate command history field, wherein the deallocate command history field comprises a plurality of bits, and each bit is used to indicate if the data of a corresponding page is valid or invalid. For example, if a zone has 282 pages, the deallocate command history field comprises 282 bits, and each bit corresponds to one page. If the bit is equal to "1", it means that the data within the corresponding page is valid; and if the bit is equal to "0", it means that the data within the corresponding page is invalid. In the embodiment shown in FIG. 19, all of the data of the zones Z1-Z3 is rewritten into the flash memory module 124, and no deallocate command is received, so the bits of the deallocate command history field are all equal to "1", and the valid page count of each of the zones Z1-Z3 is equal to "282".

Then, if the flash memory controller 122 receives a deallocate command from the host device 110 to deallocate a logical address range, the microprocessor 212 can refer to the logical address range within the deallocate command to flip the corresponding bits of the deallocate command history field. Specifically, referring to FIG. 20, if the flash memory controller 122 receives a deallocate command from the host device 110 to deallocate a logical address range corresponding to one hundred pages, the microprocessor 212 can update the corresponding bits of the corresponding to the one hundred pages from "1" to "0".

It is noted that the zone valid page mapping table 1900 can be updated based on the deallocate command from the host device 100 only, without referring to the valid page count table 900/1400 and/or the detailed valid page count table 1500.

In the embodiment shown in FIG. 19, the term "page" can indicate a logical address range corresponding to one physical page (e.g., 16 KB) of a block or a logical address unit (e.g., a logical block address, 4 KB).

Figure 21:
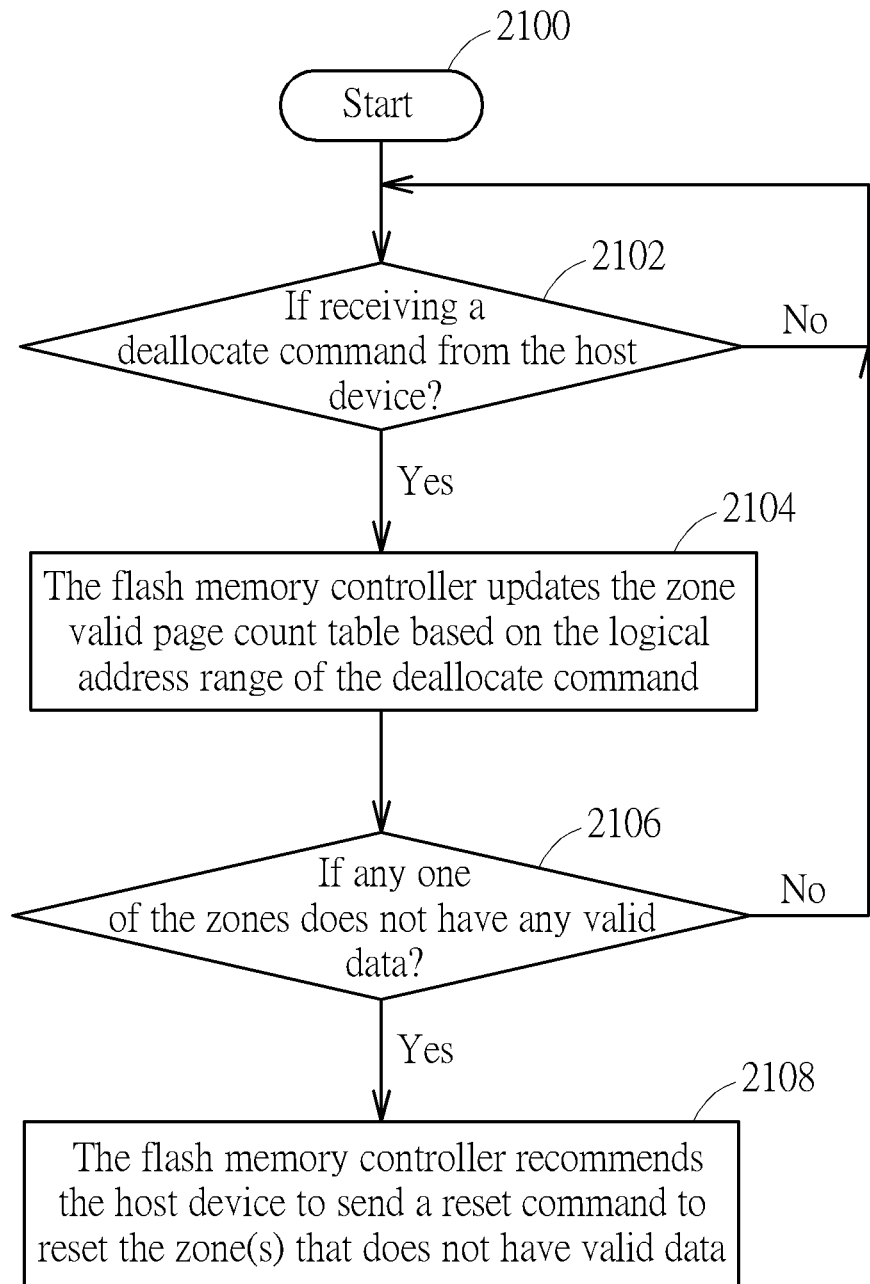
FIG. 21 is a flowchart of a control method of the flash memory controller according to one embodiment of the present invention.

FIG. 21 is a flowchart of a control method of the flash memory controller 122 according to one embodiment of the present invention. Referring to the above embodiments of FIG. 19 and FIG. 20 together, the flow is described as follows.

Step 2100: the flow starts.

Step 2102: the flash memory controller determines if receiving a deallocate command from the host device, and if yes, the flow enters Step 2104; and if not, the flow stays at Step 2102.

Step 2104: the flash memory controller updates the zone valid page count table based on the logical address range of the deallocate command.

Step 2106: the flash memory controller refers to the zone valid page count table to determine if any one of the zones does not have any valid data, and if yes, the flow enters Step 2108; and if not, the flow goes back to Step 2102.

Step 2108: the flash memory controller recommends the host device to send a reset command to reset the zone (s) that does not have valid data.

Briefly summarized, in the control method of the flash memory controller of the present invention, by establishing a valid page count table, a detailed valid page count table and/or a zone valid page count table according to deallocate command from the host device, the flash memory controller can efficiently and quickly determine if any one of the zones does not have any valid data, so that the flash memory controller can recommend the host device to send a reset command to reset the zone.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a flash memory controller, wherein the flash memory controller is configured to access a flash memory module, the flash memory module comprises a plurality of blocks, and the control method comprises the steps of:
  receiving a settling command from a host device, wherein the settling command configures at least one portion of the flash memory module as a zoned namespace, wherein the zoned namespace logically comprises a plurality of zones, the host device performs a zone-based data write operation on the zoned namespace, each zone has a same size, logical addresses corresponding to each zone are continuous, and the logical addresses are not overlapping between zones;
  writing data of a first zone into at least one first block;
  establishing a zone-block mapping table, wherein the zone-block mapping table comprises information about the first zone and the corresponding at least one first block;
  establishing or updating a valid page count table after the data is written into the at least one first block, wherein the valid page count table records each of the blocks and corresponding valid page count;
  receiving at least one deallocate command from the host device, wherein each deallocate command comprises a logical address range that is to be deallocated;
  updating the valid page count table according to the deallocate command to generate an updated valid page count table;
  determining if the valid page counts of the at least one first block corresponding to the first zone become zero according to the updated valid page count table;
  if the valid page counts of the at least one first block corresponding to the first zone become zero, recommending the host device to send a reset command, wherein the reset command is used to reset the first zone.

2. The control method of claim 1, wherein the at least one first block only corresponds to the first zone.

3. The control method of claim 1, wherein the step of recommending the host device to send the reset command comprises:
  setting a reset zone recommended attribute corresponding to the first zone from a first logical value to a second logical value, wherein the reset zone recommended attribute having the first logical value indicates that not all of the data corresponding to the first zone becomes invalid, the reset zone recommended attribute having the second logical value indicates that all of the data corresponding to the first zone becomes invalid, and the reset zone recommended attribute is read by the host device to determining if sending the reset command to the flash memory controller.

4. A flash memory controller, wherein the flash memory controller is configured to access a flash memory module, the flash memory module comprises a plurality of blocks, and the flash memory controller comprising:
  a read only memory, configured to store a code;
  a microprocessor, configured to execute the code for controlling access of the flash memory module; and
  a buffer memory;
  wherein the microprocessor is configured to perform the steps of:
  receiving a settling command from a host device, wherein the settling command configures at least one portion of the flash memory module as a zoned namespace, wherein the zoned namespace logically comprises a plurality of zones, the host device performs a zone-based data write operation on the zoned namespace, each zone has a same size, logical addresses corresponding to each zone are continuous, and the logical addresses are not overlapping between zones;
  writing data of a first zone into at least one first block;
  establishing a zone-block mapping table, wherein the zone-block mapping table comprises information about the first zone and the corresponding at least one first block;
  establishing or updating a valid page count table after the data is written into the at least one first block, wherein the valid page count table records each of the blocks and corresponding valid page count;
  receiving at least one deallocate command from the host device, wherein each deallocate command comprises a logical address range that is to be deallocated;
  updating the valid page count table according to the deallocate command to generate an updated valid page count table;
  determining if the valid page counts of the at least one first block corresponding to the first zone become zero according to the updated valid page count table;
  if the valid page counts of the at least one first block corresponding to the first zone become zero, recommending the host device to send a reset command, wherein the reset command is used to reset the first zone.

5. The flash memory controller of claim 4, wherein the at least one first block only corresponds to the first zone.

6. The flash memory controller of claim 4, wherein the step of recommending the host device to send the reset command comprises:
  setting a reset zone recommended attribute corresponding to the first zone from a first logical value to a second logical value, wherein the reset zone recommended attribute having the first logical value indicates that not all of the data corresponding to the first zone becomes invalid, the reset zone recommended attribute having the second logical value indicates that all of the data corresponding to the first zone becomes invalid, and the reset zone recommended attribute is read by the host device to determining if sending the reset command to the flash memory controller.

7. A storage device, comprising:
  a flash memory module, wherein the flash memory module comprises a plurality of blocks; and
  a flash memory controller, configured to access the flash memory module;
  wherein the flash memory controller is configured to perform the steps of:
  receiving a settling command from a host device, wherein the settling command configures at least one portion of the flash memory module as a zoned namespace, wherein the zoned namespace logically comprises a plurality of zones, the host device performs a zone-based data write operation on the zoned namespace, each zone has a same size, logical addresses corresponding to each zone are continuous, and the logical addresses are not overlapping between zones;

writing data of a first zone into at least one first block;

establishing a zone-block mapping table, wherein the zone-block mapping table comprises information about the first zone and the corresponding at least one first block;

establishing or updating a valid page count table after the data is written into the at least one first block, wherein the valid page count table records each of the blocks and corresponding valid page count;

receiving at least one deallocate command from the host device, wherein each deallocate command comprises a logical address range that is to be deallocated;

updating the valid page count table according to the deallocate command to generate an updated valid page count table;

determining if the valid page counts of the at least one first block corresponding to the first zone become zero according to the updated valid page count table;

if the valid page counts of the at least one first block corresponding to the first zone become zero, recommending the host device to send a reset command, wherein the reset command is used to reset the first zone.

8. The storage device of claim 7, wherein the at least one first block only corresponds to the first zone.

9. The storage device of claim 7, wherein the step of recommending the host device to send the reset command comprises:

setting a reset zone recommended attribute corresponding to the first zone from a first logical value to a second logical value, wherein the reset zone recommended attribute having the first logical value indicates that not all of the data corresponding to the first zone becomes invalid, the reset zone recommended attribute having the second logical value indicates that all of the data corresponding to the first zone becomes invalid, and the reset zone recommended attribute is read by the host device to determining if sending the reset command to the flash memory controller.

\* \* \* \* \*